United States Patent
Prigandt et al.

(10) Patent No.: US 7,858,202 B2
(45) Date of Patent: Dec. 28, 2010

(54) COMPOSITE BODIES HAVING A POLYACETAL PORTION AND A THERMOPLASTIC VULCANIZED ELASTOMER PORTION, PROCESSES FOR MAKING THE SAME, ARTICLES INCLUDING SUCH BODIES AND USES THEREFOR

(75) Inventors: Marco Prigandt, Kahl am Main (DE); Frank Reil, Seeheim-Jugenheim (DE); Ursula Ziegler, Mainz-Kostheim (DE); Werner Aumüller, Unteraltenbernheim (DE); Uwe Stenglin, Adelshofen/Tauberzell (DE); Bernhard Ulmer, Uffenheim (DE)

(73) Assignee: Ticona GmbH, Kelsterbach (DE)

( * ) Notice: Subject to any disclaimer, the term of this patent is extended or adjusted under 35 U.S.C. 154(b) by 663 days.

(21) Appl. No.: 11/576,309

(22) PCT Filed: Sep. 28, 2005

(86) PCT No.: PCT/EP2005/010504

§ 371 (c)(1),
(2), (4) Date: Jun. 11, 2007

(87) PCT Pub. No.: WO2006/034860

PCT Pub. Date: Apr. 6, 2006

(65) Prior Publication Data

US 2007/0264514 A1 Nov. 15, 2007

(30) Foreign Application Priority Data

Sep. 29, 2004 (DE) .................... 10 2004 047 200

(51) Int. Cl.
*B32B 27/08* (2006.01)
*B32B 27/30* (2006.01)
*B32B 27/32* (2006.01)
*B32B 27/42* (2006.01)
*B29C 45/14* (2006.01)

(52) U.S. Cl. ............... 428/501; 428/412; 428/425.3; 428/477.4; 428/480; 428/524; 264/248; 264/265; 264/271.1; 264/279; 264/279.1

(58) Field of Classification Search .................. None
See application file for complete search history.

(56) References Cited

U.S. PATENT DOCUMENTS 4,493,751 A 1/1985 Cherdron et al.

(Continued)

FOREIGN PATENT DOCUMENTS

DE 2947490 6/1981

(Continued)

*Primary Examiner*—Monique R Jackson
(74) *Attorney, Agent, or Firm*—Dority & Manning, P.A.

(57) ABSTRACT

Composite bodies, processes for making them, and their uses are disclosed, the composite bodies comprising a polyacetal portion and a modified thermoplastic vulcanizate portion bonded together, wherein the modified thermoplastic vulcanizate portion comprises a modified thermoplastic vulcanizate elastomer having a hardness of 30 to 90 Shore A and wherein the modified thermoplastic vulcanizate elastomer comprises: (a) 2 to 75% by weight of an at least partially crosslinked ethylene-propylene-diene rubber in from 1 to 50% by weight of a polyolefinic matrix further comprising 0.05 to 10% by weight of an ingredient selected from the group consisting of stabilizers, crosslinking aids, and mixtures thereof; (b) 1 to 30% by weight of a compatibilizer; and (c) 10 to 70% by weight of a non-olefinic thermoplastic material, all percentages by weight based on a total weight of the modified thermoplastic vulcanizate elastomer.

16 Claims, 2 Drawing Sheets

U.S. PATENT DOCUMENTS

| | | |
|---|---|---|
| 5,562,961 A | 10/1996 | Buchholz et al. |
| 5,852,118 A | 12/1998 | Horrion et al. |
| 5,977,266 A | 11/1999 | Reil et al. |
| 6,044,963 A | 4/2000 | Lerch et al. |
| 6,057,044 A | 5/2000 | Rennar et al. |
| 6,296,797 B1 * | 10/2001 | Ziegler et al. ............... 264/255 |
| 6,312,824 B1 | 11/2001 | Philippoz et al. |
| 6,380,290 B1 | 4/2002 | Bonte et al. |
| 6,384,179 B2 | 5/2002 | Tanimura et al. |
| 6,414,081 B1 | 7/2002 | Ouhadi et al. |
| 6,462,132 B2 | 10/2002 | Willems et al. |
| 6,517,949 B1 | 2/2003 | Mutsuda et al. |
| 6,777,487 B2 | 8/2004 | Niino et al. |
| 7,264,868 B2 * | 9/2007 | Ajbani et al. ............... 428/217 |
| 2001/0041772 A1 | 11/2001 | Masubuchi et al. |
| 2007/0154727 A1 | 7/2007 | Ziegler et al. |
| 2007/0166561 A1 | 7/2007 | Ziegler et al. |
| 2008/0029934 A1 | 2/2008 | Ziegler et al. |

FOREIGN PATENT DOCUMENTS

| | | |
|---|---|---|
| DE | 4434656 C1 * | 4/1996 |
| DE | 4439766 | 4/1996 |
| DE | 19845235 | 5/2000 |
| DE | 10017486 | 10/2001 |
| EP | 0835898 | 4/1998 |
| EP | 0837097 | 4/1998 |
| EP | 1095962 | 5/2001 |
| EP | 1118458 | 7/2001 |
| WO | WO-94/25245 | 11/1994 |
| WO | WO-99/29777 | 6/1999 |
| WO | WO-00/20204 | 4/2000 |

* cited by examiner

COMPOSITE BODIES HAVING A POLYACETAL PORTION AND A THERMOPLASTIC VULCANIZED ELASTOMER PORTION, PROCESSES FOR MAKING THE SAME, ARTICLES INCLUDING SUCH BODIES AND USES THEREFOR

CROSS-REFERENCE TO RELATED APPLICATIONS

This application is a national stage application, under 35 U.S.C. §371, of PCT/EP2005/010504, filed Sept. 28, 2005, which claims priority of German Application No. 10 2004 047 200.9, filed Sept. 29, 2004.

BACKGROUND OF THE INVENTION

The invention relates to a composite body composed of polyacetal and of at least one thermoplastic vulcanizate (TPV) elastomer (=TPV), and also to a process for its production, where modification of the TPV elastomer with non-olefinic thermoplastic materials enabled an adhesive or cohesive bonding to be obtained between the polyacetal and the TPV. Use of specific crosslinking agent systems can avoid degradation of the polyacetal.

Polyacetal, i.e. polyoxymethylene (POM), is an engineering material with excellent mechanical properties and is also moreover generally resistant to all of the usual solvents and engine fuels. Good strength and hardness associated with excellent rebound resilience means moldings composed of polyacetal are very frequently used for snap connections, in particular clips, in every sector of everyday life. Excellent sliding friction properties are the reason for use of POM for many movable parts, such as transmission parts, deflector rolls, gearwheels, or shift levers. Moldings composed of POM are also very frequently used in automobile construction. Very good mechanical strength and chemicals resistance mean that POM is also used to produce a wide variety of housings and keyboards.

However, POM has a low mechanical damping factor at room temperature, and in some applications this necessitates use of soft damping elements. When moldings composed of POM are installed, connection sites also often require a seal. The high surface hardness of moldings composed of POM and the low coefficient of sliding friction of POM can lead to slip of superposed articles and can create risk in the operation of, for example, switching elements and control elements composed of POM. On the other hand, it is true that combinations composed of hard and soft materials are used with increasing frequency in order to achieve a mutual combination of the particular properties of these materials. The hard material here is intended to give the components their strength, and because the soft material has elastic properties it assumes functions related to sealing or vibration-damping and sound-deadening, or brings about a change in surface feel. Adequate adhesion between the hard and the soft components is important in these applications.

One of the methods used hitherto provides gaskets and damping elements separately and usually uses an additional operation for their mechanical anchoring or adhesive-bonding, thus generating additional work and sometimes considerable additional costs.

A more modern and more cost-effective method is multi-component injection molding. In this, by way of example, a second component is injection-molded onto a previously molded first component. The adhesion achievable between the two components is of great importance for this process. Although this adhesion in multicomponent injection molding can often be further improved via introduction of undercuts within interlocking connections, good underlying adhesion via chemical affinity between the selected components is often a precondition for their use.

Examples of well-known combinations produced by multicomponent injection molding are composed of polypropylene and of polyolefin elastomers or of styrene-olefin elastomers, polybutylene terephthalate with polyester elastomers or styrene-olefin elastomers. Polyamides, too, adhere to very many soft components.

There are also known moldings composed of polyacetal onto which functional elements have been directly molded, these having been produced with use of non-crosslinked rubbers (DE-C 44 39 766). However, the bond strength of such composite bodies is not yet satisfactory.

A further publication relates to composite bodies of exactly this type which are composed inter alia of a polyacetal, of a rubber copolymer, of a reinforcing filler, of a crosslinking agent, and, if appropriate, of further conventional additives (DE-A 196 41 904). Here, the rubber component, which has been prepared in the absence of any crosslinking agent, is bonded at from 130 to 170° C., after addition of a crosslinking agent, via injection molding to a previously prepared polyacetal molding, and then the polyacetal-rubber composite body is formed in a further step at from 140 to 180° C. via vulcanization of the rubber copolymer. No particularly good adhesion of the polymer components is achieved until the rubber content has been vulcanized. However, this additional step is considered to be disadvantageous because of the elevated vulcanization temperatures and times.

DE-C 19845235 discloses composite bodies composed of polyacetal and of styrene-olefin elastomers, these having been modified via addition of non-olefinic thermoplastic material. However, disadvantages are their relatively high compression set values in various ranges of application temperature and their unsatisfactory chemicals resistance with respect to aromatic and aliphatic hydrocarbons, fats, and oils. There is a need, however, for hard/soft components which can be produced via multi-component injection-molding technology and which can be used in the engine compartments of automobiles, and which provide not only relatively low compression set values in various ranges of application temperature but also relatively high heat resistance (relatively low creep) in conjunction with improved chemicals resistance.

Another possibility in the production of composite bodies is provided by use of adherent intermediate sublayers. By way of example, EP 0 921 153 A1 discloses that polar and non-polar polymers can be mixed via use of specific block polymers as compatibilizers composed of a functionalized polymer and of a polyamide. The resultant polymer mixtures can be used as adhesive intermediate sublayer for production of composite bodies composed of a polar and non-polar thermoplastic polymer. According to EP 0 837 097 A1, production of composite bodies composed of a polar and non-polar thermoplastic polymer is also successful with the aid of block copolymers containing a chemically modified polyolefin and a thermoplastic polyurethane, a copolyester, or a polyamide. However, it would be desirable to omit use of complicated block copolymers in production of composite bodies composed of polyacetals and of thermoplastic elastomers.

It is therefore an object of the present invention to provide a composite body composed of polyacetal and of thermoplastic elastomers without the disadvantages and restrictions mentioned.

Experience hitherto in the search for novel hard/soft combinations has shown that direct combination of polyacetal and TPV is not possible (Advanced Elastomer Systems, Rev. 06/2001 p. 1; Santoprene® thermoplastic rubber 8211-55B100 TPV), since the crosslinking agents conventionally used for the TPV, e.g. phenolic resins or peroxides, lead to degradation of the polyacetal.

BRIEF SUMMARY OF THE INVENTION

Surprisingly, it has now been found that an adhesive bond can be achieved with the desired properties with very good adhesion from polyacetal and from a TPV modified via non-olefinic thermoplastic material, In contrast, TPV modified with olefinic thermoplastic material does not adhere to polyacetal.

The invention therefore provides a composite body composed of at least one polyacetal and of at least one modified TPV elastomer, which comprises from 10 to 70% by weight of non-olefinic thermoplastic material, based on the weight of the modified TPV elastomer, and at least from 1 to 30% of a compatibilizer, and also a process for its production, where either a molding composed of polyacetal is first molded and then onto this a coating or at least one molding composed of the modified TPV elastomer is applied by injection molding, or the modified TPV elastomer is first pre-injection-molded and then a coating or at least one molding composed of the polyacetal is applied by injection molding, where the polyacetal is bonded adhesively or cohesively to the modified TPV elastomer. The peel resistance of the inventive composite body is at least 0.5 N/mm. According to the invention, the preferred compression set value of the modified TPV elastomer should be <65% at 70° C. after 24 h to DIN ISO 815.

The inventive composite body here is formed via a polyacetal molding which has been to some extent or completely coated with the modified TPV elastomer, or onto which one or more moldings, also termed functional parts, composed of the modified TPV elastomer have been directly molded. By way of example, this can be a flat polyacetal molding which bears a layer composed of TPV elastomer on one side. Examples of these are antislip underlays, grip recesses, operating units and switching units, functional parts provided with gaskets or with damping elements, and also interior and exterior cladding on two-wheeled vehicles, on other motor vehicles, on aircraft, on rail vehicles, and on watercraft, where by virtue of the polyacetal these have the required dimensional stability, and by virtue of the elastomer layer they have the desired frictional property, sealing function, feel, or appearance.

However, the composite body can also be composed of one or more polyacetal moldings of any desired shape, onto which one or more moldings of any desired shape composed of the modified TPV elastomer have been directly molded. The expression "directly molded" is intended to mean, for the purposes of the present invention, that the functional elements have been directly injection-molded, in particular in a multicomponent injection-molding process, onto the molding composed of polyacetal with which they are intended to enter into an adhesive bond.

Use of the TPV elastomers modified with non-olefinic thermoplastic material permits by way of example direct molding of sealing or damping elements composed of the elastomer onto moldings composed of polyacetal without any requirement for further assembly steps. A considerable cost saving can be achieved in production of the inventive composite bodies by virtue of the omission of the processing steps previously needed for the assembly of functional elements.

DETAILED DESCRIPTION OF THE INVENTION

Figure 1:
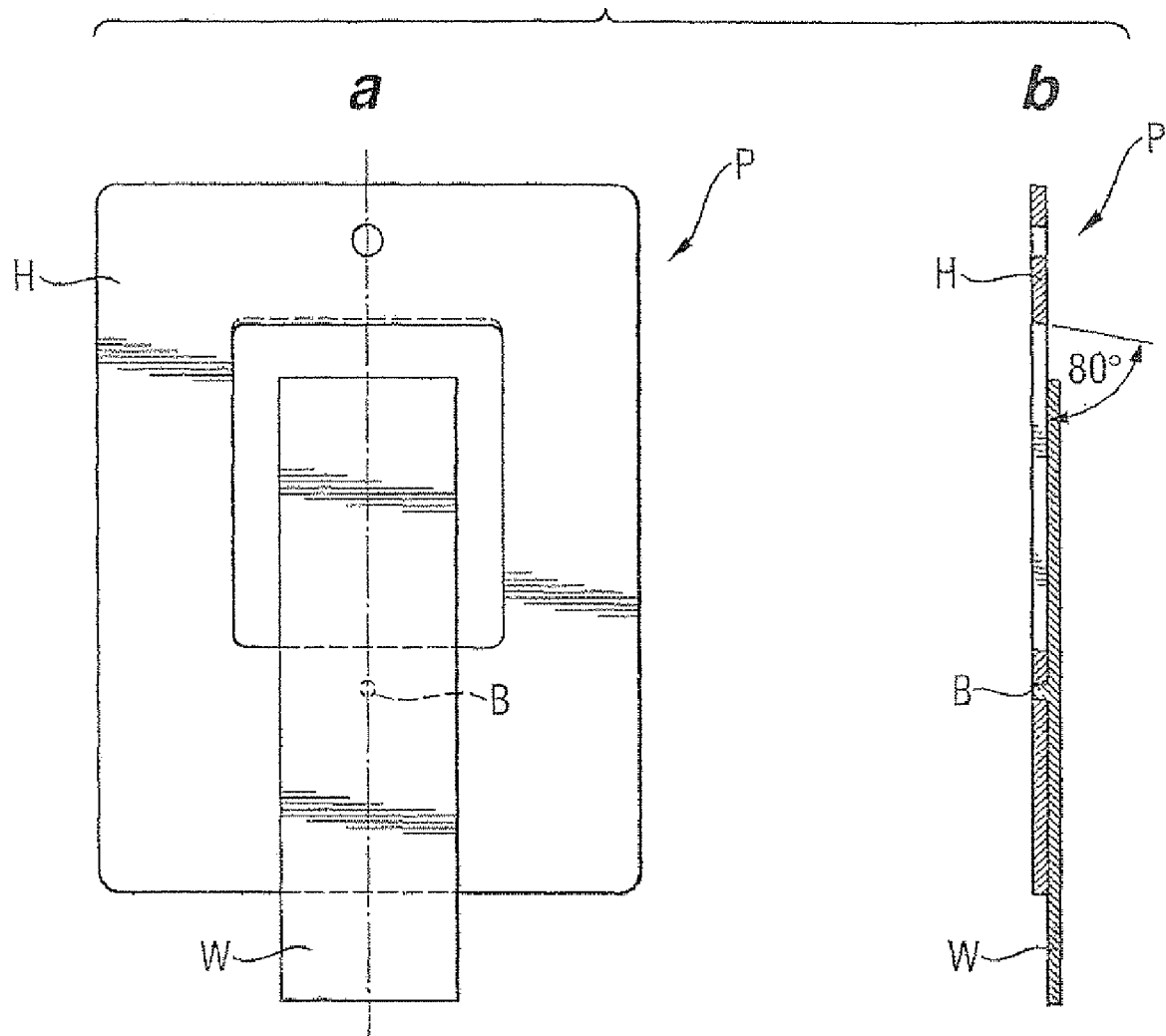
FIG. 1 illustrates a front view and a side view of a test specimen in determining bond strength between a hard component and a soft component.

The composite body is produced by the well-known methods and processes. Use of the multicomponent injection-molding process is advantageous, the polyacetal first being molded, i.e. pre-injection-molded, in the injection mold, and a coating or a molding composed of the modified TPV elastomer then being injection-molded onto the polyacetal molding.

If the geometry of the molding permits this, the composite body can also be produced by an inverted sequence of the multicomponent process, i.e. first pre-injection-molding a molding composed of the TPV elastomer and then applying, by injection molding, a coating composed of the polyacetal or at least one molding composed of the polyacetal.

The melt temperature here during manufacturing of the polyacetal molding is in the usual range, i.e. for the polyacetals described below it is in the range from about 180 to 240° C., preferably from 190 to 230° C. The temperature of the mold itself is controlled to a temperature in the range from 20 to 140° C. A mold temperature in the upper part of the temperature range is advantageous for the dimensional accuracy and dimensional stability of the hard body of the component composed of polyacetal, which is a semicrystalline material.

As soon as the cavity in the mold has been filled completely and the hold pressure has no further effect (gate-sealing point), the polyacetal molding can be subjected to full and final cooling and can be demolded as the first part of the composite (premolding). In a second, subsequent separate injection molding step, by way of example, this premolding is then inserted or transferred into another mold whose cavity has additional space, and the material with the lower hardness, i.e. the modified TPV elastomer, is injected into the mold and thus injection-molded onto the polyacetal molding. This process is known as the insert process or transfer process. With respect to the adhesion subsequently achievable, it is particularly advantageous for the polyacetal molding first injection-molded to be preheated to a temperature in the range from 80° C. to just below the melting point. This facilitates incipient melting of the surface via the TPV elastomer injection-molded onto the material and penetration of this elastomer into the interface layer.

However, in another possible method the polyacetal molding first injection-molded is only partially demolded and is moved together with a portion of the original mold (e.g. the feed plate, the ejector half, or just one indexing plate) into another larger cavity.

Another possible method consists in injecting the modified TPV elastomer into the same mold, without intermediate opening of the machine and onward transport of the premolding composed of polyacetal. Here, the mold cavities intended for the elastomer component are initially sealed via displaceable inserts or cores during injection of the polyacetal component, and are not opened until the elastomer component is injected (slide technique). This version of the process is also particularly advantageous for achieving good adhesion, since the melt of the TPV elastomer encounters a premolding which is still hot, after only a short cooling time.

If appropriate, further moldings composed of polyacetal and of the modified TPV elastomer can be applied by injection molding simultaneously or in sequential steps by the multicomponent injection-molding process.

When the modified TPV elastomer is applied by injection molding, for good adhesion it is advantageous to select maximum possible settings for the melt temperature, and also for the injection pressure and the hold pressure. The melt temperature of the TPV elastomer is generally in the range from 170 to 270° C., with an upward limit imposed by its decomposition. The values for injection rate and also for injection pressure and hold pressure are machine- and molding-dependent and are to be matched to the particular circumstances.

In all of the versions of the process, with or without demolding of the premolding, the mold is temperature-controlled in the second step to a temperature in the range from 20° C. to 140° C. As a function of the design of the parts, it can be advisable to lower the mold temperature somewhat, in order to optimize demoldability and cycle times. Once the parts have cooled, the composite is demolded. An important factor here related to the design of the mold is to attach the ejectors at a suitable site which minimizes the loading on the bonded joint of the materials. Sufficient venting of the cavity in the joint region is also to be provided in the design of the mold, in order to minimize inhibition of bonding between the two components via included air. A similar effect results from the nature of the roughness of the mold wall. For development of good adhesion, the surface at the site of the bonded joint is advantageously smooth, since less air is then included in the surface.

The polyacetal used according to the invention comes from the group of the known polyoxymethylenes (POM), these being described by way of example in DE-A 29 47 490. The production of composite bodies described above has specifically not been successful hitherto with these polyoxy-methylenes. The polyoxymethylenes are generally unbranched linear polymers which generally contain at least 80 mol %, preferably at least 90 mol %, of oxymethylene units ($-CH_2O-$). The term polyoxymethylenes here encompasses not only homopolymers of formaldehyde or its cyclic oligomers, such as trioxane or tetroxane, but also corresponding copolymers.

Homopolymers of formaldehyde or of trioxane are polymers whose hydroxy end groups have been chemically stabilized in a known manner with respect to degradation, e.g. via esterification or etherification.

Copolymers are polymers composed of formaldehyde or of its cyclic oligomers, in particular trioxane, and of cyclic ethers, of cyclic acetals, and/or of linear polyacetals.

Comonomers that can be used are firstly cyclic ethers having 3, 4, or 5, but preferably 3, ring members, and secondly cyclic acetals other than trioxane having from 5 to 11, preferably 5, 6, 7, or 8, ring members, and also linear polyacetals, amounts used in each case being from 0.1 to 20 mol %, preferably from 0.5 to 10 mol %.

The melt index (MFR value 190/2.16) of the polyacetal polymers used is generally from 0.5 to 75 g/10 min (ISO 1133).

It is also possible to use modified types of POM. Among these modified types are, by way of example, blends composed of POM with TPEU (thermoplastic polyurethane elastomer), with MBS (methyl methacrylate-butadiene-styrene core-shell elastomer), with methyl methacrylate-acrylate core-shell elastomer, with PC (polycarbonate), with SAN (styrene-acrylonitrile copolymer), or with ASA (acrylate-styrene-acrylonitrile copolymer compounded material).

The modified TPV elastomers used according to the invention are compounded materials with hardness of from 30 to 90 Shore A (determined to DIN 53505, corresponding to ISO 868)), comprising the following components:

a) from 2 to 75% by weight, preferably from 5 to 75% by weight, particularly preferably from 20 to 50% by weight, of an entirely or to some extent crosslinked ethylene-propylene-diene rubber (EPDM) in from 1 to 50% by weight, preferably from 3 to 50% by weight, particularly preferably from 10 to 30% by weight, of a polyolefinic matrix, for example composed of, if appropriate, functionalized polyethylene (PE), or oft if appropriate, functionalized polypropylene (PP), and/or of copolymers of these, preferably polypropylene, with addition of from 0.05 to 10% by weight, preferably from 0.1 to 5% by weight, of stabilizers, preferably phenolic antioxidants, and/or crosslinking aids, preferably azo compounds, maleimides, selenium, tellurium, sulfur, sulfur compounds, in particular thio compounds, and particularly preferably peroxides, in particular alkyl or aryl peroxides, e.g. dicumyl peroxide, 2,5-dimethyl-2,5-di(tert-butylperoxy)hexane or di-tert-butyl peroxide. Component a) can also, if appropriate, comprise further additives, in particular plasticizers and fillers.

b) from 1 to 30% by weight of at least one compatibilizer, such as, if appropriate functionalized, styrene-olefin block copolymer, methacrylate-butadiene-styrene (MBS), MABS (methyl methacrylate-acrylonitrile-butadiene-styrene), functionalized EPDM and, respectively, ethylene-propylene rubber (EPM), and/or functionalized polyolefins; and c) from 10 to 70% by weight of a non-olefinic thermoplastic material.

The TPV elastomer can moreover comprise d) if appropriate up to 50% by weight of plasticizer oil (e.g. paraffinic mineral oils, synthetic oils, ester plasticizers, naphthenic oils, semisynthetic oils, silicone oils, etc., preferably paraffinic mineral oils), and/or up to 50% by weight of organic and/or inorganic fillers and, respectively, reinforcing materials (e.g. chalk, talc, glass beads, glass fibers, silica, nanoparticles, e.g. phyllosilicates or the like, kaolin, wollastonite, bentonite, magnesium hydroxide and/or aluminum hydroxide, etc., preferably chalk); and/or e) additives, e.g. antioxidants, light stabilizers, nucleating agents, mold-release agents, internal or external lubricants, pigments, carbon black, halogen-free and/or halogenated flame retardants, optical brighteners, hydrocarbon resins and/or epoxy resins, antistatic agents, microbicides, fungicides, etc., familiar crosslinking agents, e.g. peroxides, phenolic resins, and sulfur, or the like, preferably peroxides, and also familiar crosslinking promoters, e.g. silanes, guanidines, sulfur compounds, e.g. cadmium-, copper-, lead-, zinc-, and tellurium-selenium-sulfur compounds, in particular the corresponding dithiocarbamates, the corresponding thiurams, or xanthates, thioureas, triallyl isocyanurate, triallyl cyanurate, trimethylolpropane trimethacrylate, alpha-methylstyrene, or the like, in the amounts generally used.

The % by weight data given are based on the total weight of the TPV elastomer (compounded material).

The polyolefins and copolymers mentioned under a) and b) have been, if appropriate, functionalized via groups or compounds which can have been selected from the group of the compounds containing carbonyl groups and/or containing carboxy groups, e.g. maleic acid, its derivatives, such as maleimide and/or maleic anhydride (MAH), acrylic acid, acrylates and/or their derivatives, in particular GMA (glycidyl methacrylate), the compounds containing epoxy groups, e.g. glycidyl methacrylate or glycidyl ethacrylate, amino groups or imino groups, amide groups, metal carboxylate groups, carbonate groups, nitrile groups, ether groups, ester groups, urethane groups, cyanate groups, isocyanate groups, cyanurate groups, isocyanurate groups, and/or hydroxy groups. Functionalized polyolefins also mean mixtures with other polar materials, e.g. PP/ABS blends, PP/PA blends or PE/PMMA blends (where ABS=acrylonitrile-butadiene-styrene copolymer, PMMA=polymethyl methacrylate).

For the EPDM rubber mentioned under a), it is in principle possible to use any desired diene. Diene monomers mainly used are cis,cis-1,5-cyclooctadiene, exo-dicyclopentadiene, endo-dicyclopentadiene, 1,4-hexadiene, and 5-ethylidene-2-norbornene. 5-Ethylidene-2-norbornene is preferred.

The component a) used preferably comprises crosslinked, in particular peroxidically crosslinked, EPDM/polyolefins, where component a) itself preferably comprises no remaining residue of unreacted crosslinking agent or at least is almost free from crosslinking agents, where this means a residual crosslinking agent content below 0.1% by weight, preferably below 0.5% by weight, particularly preferably below 0.01% by weight. An example of a method for achieving this consumes or degrades the crosslinking agent during the compounding of the TPV elastomer. For this, it is preferable to use small amounts of the crosslinking agent of from 0.01 to 5% by weight, particularly preferably from 0.1 to 2% by weight, based on the weight of the TPV elastomer.

The non-olefinic thermoplastic material mentioned under c) is selected from the group of: thermoplastic polyester urethane elastomers, thermoplastic polyether urethane elastomers, thermoplastic polyesters, for example polyethylene terephthalate and/or polybutylene terephthalate, thermoplastic polyesterester elastomers, thermoplastic polyetherester elastomers, thermoplastic polyetheramide elastomers, thermoplastic polyamides, thermoplastic polycarbonates, thermoplastic polyacrylates, acrylate rubbers, styrene-acrylonitrile-acrylate rubbers (ASA). It is also possible to use a mixture of the materials mentioned.

Component a) is also used in the form of TPV masterbatch, which generally means a dynamically crosslinked pre-compound material comprising, based on the TPV masterbatch (pre-compound)
from 10 to 75% by weight, preferably from 20 to 40% by weight, of ethylene-propylene-diene rubber (EPDM)
from 5 to 50% by weight, preferably from 5 to 20% by weight, of polyolefin, preferably polypropylene (PP),
from 0 to 70% by weight, preferably from 35 to 60% by weight, of plasticizer oil, in particular paraffinic mineral oil,
from 0 to 50% by weight of organic and/or inorganic fillers, preferably chalk or barium sulfate,
from 0.1 to 10% by weight, preferably from 0.2 to 5% by weight, of stabilizers, preferably phenolic antioxidants, and/or crosslinking aids, preferably peroxides.

The proportion by weight of the TPV masterbatch (component a) introduced into the TPV elastomer is preferably from 20 to 89% by weight, particularly preferably from 30 to 70% by weight, based on the total weight of the TPV elastomer.

The examples used a TPV masterbatch composed of a peroxidically crosslinked compounded EPDM/PP material.

Suitable plasticizer oils, inorganic fillers, stabilizers, and crosslinking aids for the TPV masterbatch are those mentioned above.

The compounded material is prepared by the familiar compounding process by means of a co-rotating twin-screw extruder (ZSK).

It is possible to prepare modified TPV elastomers with different properties via variation of the constitution of the TPV masterbatch, and also of the proportions of components a) to e).

The hardness of the inventive modified compounded TPV materials is in the range from 30 to 90 Shore A, preferably 40 to 80 Shore A. This hardness can be adjusted as required via the proportions of the plasticizer and of the thermoplastic component.

It is generally possible to use olefinic thermoplastics for the thermoplastic content in the TPV elastomer, examples being polyethylene, polypropylene, and polyolefin elastomers, optionally also talc-reinforced or glass-fiber-filled. As shown, however, by the examples with this type of TPV elastomer modified with olefinic thermoplastic material (see PTS-UNI-PRENE-7100-55*9000 comparative example), these compounded TPV elastomer materials have no adhesion to polyacetal.

According to the invention, therefore, the TPV elastomer is modified by a compounding with non-olefinic thermoplastic material.

Not only the polyacetal but also the modified compounded TPV elastomer material can generally comprise conventional additives, such as stabilizers, nucleating agents, mold-release agents, lubricants, fillers, and reinforcing materials, pigments, carbon black, light stabilizers, flame retardants, antistatic agents, plasticizers, or optical brighteners, as mentioned above. The amounts present of the additives are those generally used.

The composite bodies according to the invention are used not only in the application sector mentioned in the introduction in the engine compartments of automobiles but also as connecting elements in the form of fittings, of couplings, of rollers, and of bearings, and as functional parts with integrated sealing properties and/or integrated damping properties, and also as antislip and easy-grip elements. Among these are also housings in automobile construction, e.g. door-closure housings, window-lift housings, or sliding-roof sealing elements, and the like, and also fastening elements with integrated seal, e.g. clips with sealing rings or with sealing disks, decorative strips with integrated sealing lip, sealing elements for compensation of expansion joints, fastening elements with good damping properties, e.g. clips with cores for damping of vibration or of noise, transmission parts, such as gearwheels with damping elements, gearboxes with integrated flexible couplings, non-slip, easy-grip elements, such as control levers or control knobs, or grip surfaces on electrical devices or on writing implements, and also chain links with a resilient surface.

EXAMPLES

The THERMOPRENE grades (modified TPV), UNIPRENE, and THERMOFLEX (comparative examples) mentioned are commercially available products from PTS-Plastic Technologie Service GmbH (Adelshofen, Federal Republic of Germany). The HOSTAFORM grades (polyacetal) listed are commercially available products from Ticona GmbH (Kelsterbach, Federal Republic of Germany).

Polyacetals Used

HOSTAFORM® C 9021

Polyoxymethylene copolymer composed of trioxane and about 2% by weight of ethylene oxide.

Melt index MFR 190/2.16 (ISO 1133): 9 g/10 min

Modification: none

HOSTAFORM® S9064

Polyoxymethylene copolymer composed of trioxane and about 2% by weight of ethylene oxide.

Melt index MFR 190/2.16 (ISO 1133): 9 g/10 min

Modification: 20% by weight of semiaromatic polyester-TPEU

HOSTAFORM® S9244

Polyoxymethylene copolymer composed of trioxane and about 2% by weight of ethylene oxide.

Melt index MFR 190/2.16 (Iso 1133):9 g/10 min

Modification: 25% by weight of MBS core-shell modifier

Modified TPV Elastomers Used

PTS-THERMOPRENE-85A10*9007: hardness 85 Shore A, density 1.09/cm$^3$

Compounded material composed of TPV masterbatch (EPDM-X+/PP)(see above for preparation), 40% content of thermoplastic polyetherester elastomer (TPEE), hardness 40 Shore D, e.g. commercially available products described as ARNITEL (DSM) or HYTREL (DuPONT), 10% MBS (methacrylate-butadiene-styrene) core-shell modifier, 15% inorganic filler (CaCO$_3$), and also additives.

PTS-THERMOPRENE-75A10*9007; hardness 75 Shore A, density 1.08 g/cm$^3$ Compounded material composed of TPV masterbatch (EPDM-X+/PP), 40% content of thermoplastic polyetherester elastomer, hardness 25 Shore D), e.g. commercially available products described as ARNITEL (DSM) or HYTREL (DuPONT), 10% MBS (methacrylate-butadiene-styrene) core-shell modifier, 15% inorganic filler (CaCO$_3$), and also additives.

PTS-THERMOPRENE-70A10*9000. hardness 70 Shore A, density 1.05 g/cm$^3$

Compounded material composed of TPV masterbatch (EPDM-X+/PP), 35% content of thermoplastic polyetherester elastomer, hardness 25 Shore D, e.g. commercially available products described as ARNITEL (DSM) or HYTREL (DuPONT), about 10% MBS (methacrylate-butadiene-styrene) core-shell modifier, 3% partially functionalized HSBC (hydrogenated styrene-olefin block copolymer), 5% plasticizer oil, 10% inorganic filler (CaCO$_3$), and also additives.

PTS-THERMOPRENE-60A10*9000: hardness 60 Shore A, density 1.04 g/cm$^3$

Compounded material composed of TPV masterbatch (EPDM-X+/PP), 25% content of thermoplastic polyetherester elastomer, hardness 25 Shore D, e.g. commercially available products described as ARNITEL (DSM) or HYTREL (DuPONT), 5% MBS (methacrylate-butadiene-styrene) core-shell modifier, 10% partially functionalized HSBC (hydrogenated styrene-olefin block copolymer), 20% plasticizer oil, 10% inorganic filler (CaCO$_3$), and also additives.

PTS-THERMOPRENE-55A10*9000: hardness 55 Shore A, density 1.05 g/cm$^3$

Compounded material composed of TPV masterbatch (EPDM-X+/PP), 25% content of thermoplastic polyetherester elastomer, hardness 25 Shore D, e.g. commercially available products described as ARNITEL (DSM) or HYTREL (DuPONT), about 10% MBS (methacrylate-butadiene-styrene) core-shell modifier, 10% partially functionalized HSBC (hydrogenated styrene-olefin block copolymer), 20% plasticizer oil, 10% inorganic filler (CaCO$_3$), and also additives.

PTS_THERMOPRENE-40A10*9007: hardness 40 Shore A, density 1.00 g/cm$^3$ Compounded material composed of TPV masterbatch (EPDM-X+/PP), 20% content of thermoplastic polyetherester elastomer, hardness 25 Shore D, e.g. commercially available products described as ARNITEL (DSM) or HYTREL (DuPONT), 15% partially functionalized HSBC (hydrogenated styrene-olefin block copolymer), 30% plasticizer oil, 10% inorganic filler (CaCO$_3$), and also additives.

PTS-THERMOPRENE-75A66*800: hardness 75 Shore A, density 1.14 g/cm$^3$

Compounded material composed of TPV masterbatch (EPDM-X+/PP), 10% content of nylon-6, 15% partially functionalized HSBC (hydrogenated styrene-olefin block copolymer), 25% inorganic filler (CaCO$_3$), and also additives.

PTS-THERMOPRENE-65A22*807: hardness 63 Shore A, density 1.05 g/cm$^3$

Compounded material composed of TPV masterbatch (EPDM-X+/PP), 40% content of thermoplastic polyester urethane (TPU), hardness 85 Shore A, e.g. commercially available products described as DESMOPAN (Bayer) or ELASTOLLAN (Elastogran), 10% MBS (methacrylate-butadiene-styrene) core-shell modifier, 10% inorganic filler (CaCO$_3$), and also additives.

PTS-THERMOPRENE-75A20*9000:hardness 73 Shore A, density 1.08 g/cm$^3$

Compounded material composed of TPV masterbatch (EPDM-X+/PP), 40% content of thermoplastic polyether urethane (TPU), hardness 85 Shore A, e.g. commercially available products described as DESMOPAN (Bayer) or ELASTOLLAN (Elastogran), 10% MBS (methacrylate-butadiene-styrene) core-shell modifier, 10% inorganic filler (CaCO$_3$), and also additives.

PTS-THERMOPRENE 65A60*807: hardness 67 Shore A, density 1.03 g/cm$^3$

Compounded material composed of TPV masterbatch (EPDM-X+/PP), 40% content of thermoplastic polyether block amide (PEBA), hardness 25 Shore D, e.g. commercially available products described as PEBAX (Atofina), 10% MBS (methacrylate-butadiene-styrene) core-shell modifier, 10% inorganic filler (CaCO$_3$), and also additives.

Comparative Examples

PTS-UNIPRENE-7100-55*9000: hardness 61 Shore A, density 0.93 g/cm³

Compounded material composed of TPV masterbatch, 7% content of thermoplastic polyolefin (PP), and also additives.

PTS-THERMOFLEX-VPIS3005/121*9007 (=mixture of DE 19845235C2): hardness 70 Shore A, density 1.17 g/cm³

Compounded material composed of high-molecular-weight functionalized and non-functionalized SEBS block copolymer, 15% plasticizer oil, 40% content of thermoplastic polyetherester elastomer (TPEE), 20% inorganic filler (CaCO₃), and also additives.

The composite bodies were produced under the conditions mentioned in table 1.

TABLE 1

| Injection-molding parameters for test specimen production | |
|---|---|
| Material of 1st component (polyacetal) HOSTAFORM C9021, S9064, S9244 | Material of 2nd component: PTS-THERMOPRENE, UNIPRENE, THERMOFLEX |
| Predrying temperature: 80 [° C.] | Predrying temperature: 80 [° C.] |
| Predrying time: 3[h] | Predrying time: 2[h] |
| Parameters | Parameters |
| Mold temperature: 70 [° C.] | Mold temperature: 20-40 [° C.] |
|  | Hot runner: 200-250 [° C.] |
|  | Hot-runner cartridge: 200-250 [° C.] |
| Heating zone 5 (nozzle): 200 [° C.] | Heating zone 5 (nozzle): 200-250 [° C.] |
| Heating zone 4: 200 [° C.] | Heating zone 4: 190-240 [° C.] |
| Heating zone 3: 200 [° C.] | Heating zone 3: 190-240 [° C.] |
| Heating zone 2: 200 [° C.] | Heating zone 2: 190-240 [° C.] |
| Heating zone 1 (hopper): 190 [° C.] | Heating zone 1 (hopper): 190-240 [° C.] |
| Injection pressure: 900-1000 [bar] | Injection pressure: 350-1100 [bar] |
| Injection rate: 40-60 [cm³/s] | Injection rate: 50-100 [cm³/s] |
| Injection time (specified value): 1.7-2.1 [s] | Injection time (specified value): 0.3-1.0 [s] |
| Changeover point: 4-6 [cm³] | Changeover point: 2-6 [cm³] |
| Hold pressure 1: 750 [bar] | Hold pressure 1: 0-600 [bar] |
| Hold-pressure time 1: 3-5 [s] | Hold-pressure time 1: 0-4 [s] |
| Residual cooling time: 6-10 [s] | Residual cooling time: 15-35 [s] |
| Back pressure: 70 [bar] | Back pressure: 20 [bar] |
| Decompression: 4 [cm³] | Decompression: 2 [cm³] |
| Screw rotation rate: 25 [min⁻¹] | Screw rotation rate: 15 [min⁻¹] |

Test Method for Determining Bond Strength Between Hard Component and Soft Component A peel-test specimen was used to assess adhesion. These test specimens were produced on a multicomponent injection-molding machine whose clamping force is 1000 kN (Arburg Allrounder, 420 V 1000-350/150, producer Arburg, D72290 Loβburg).

The soft component is applied centrally by injection molding via a hole in the hard component. This gives symmetrical flow paths. The test specimen is produced with a two-component mold by the core-back process, in order to create ideal conditions for bond strength.

The geometry of the test specimen is that of a frame with dimensions 130×100×3 mm composed of a polyacetal (hard component), the surface of this test specimen being over-molded with the modified TPV soft component. The soft component is a lip of thickness 2 mm and length 115 mm and width 35 mm.

FIG. 1a, b shows a front view and a side view of the test specimen P. The hard component forming the frame is indicated by H and the lip composed of the soft component is indicated by W.

Figure 2:
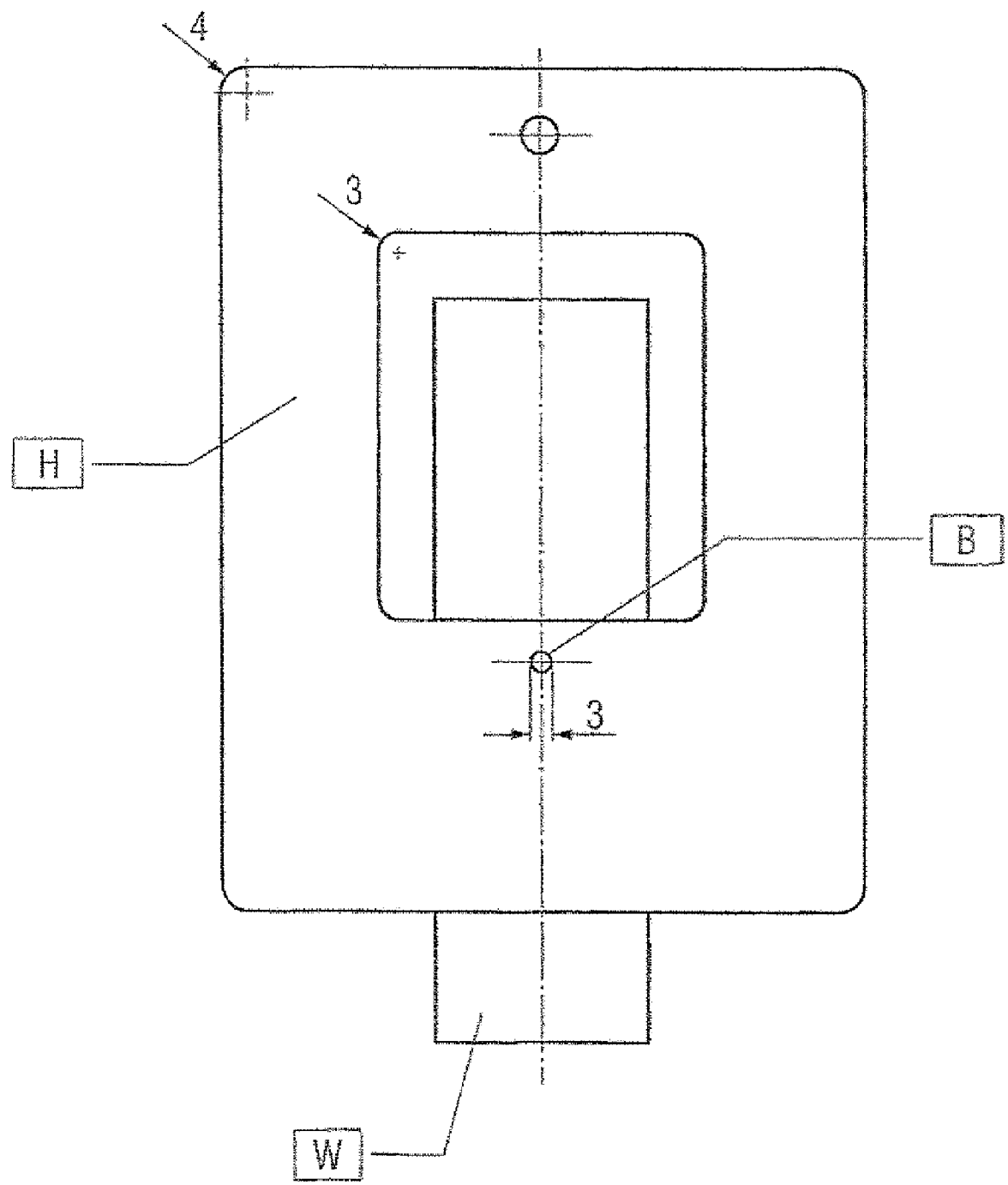
FIG. 2 illustrates a back view of a test specimen in determining bond strength between a hard component and a soft component.

FIG. 2 shows a back view where the central hole B in the hard component H is also visible.

The fundamental test for bond strength between hard component and soft component is based on a standardized test method, the DIN EN 1464 roller peel test. This test method describes the "Determination of peel resistance of high-strength adhesive bonds" and relates to adhesive bonds involving metal. The test specimen geometry used differed from that in DIN EN 1464. Because of the dimensions of the test specimens, the roller length of the roller peel test apparatus described in DIN EN 1464, which is installed into a tensile test machine, was slightly modified, to permit positioning of the test specimen.

In order to keep the effect of bending of the hard component small during the peel process at high bond strength, the wall thickness of this component was designed to be 3 mm. The wall thickness of the soft component is 2 mm, which is a dimension often found in industry for surface overmolding, the result being to ensure relatively high contact temperature during overmolding of the hard component. The peel process for the soft component takes place by a method based on DIN EN 1464 at an angle of 90° to the bond surface.

The bond strength variable from the 90° roller peel test is stated as peel resistance in the unit [N/mm]:

$$\text{Peel resistance }[N/mm] = \frac{\text{Peel force }[N]}{\text{Specimen width }[mm]}$$

The evaluation software of the tensile test machine calculates the values for minimum peel force $F_{min}$, maximum peel force $F_{max}$ and average peel force $F_{average}$.

Average peel force is taken as a measure for assessment of bond strength. Average peel resistance is calculated by dividing the value of the average peel force by the width of the specimen: 35 mm.

Compression set value of the elastomer component was determined to DIN ISO 815 at 70 and 100° C. Test specimens of type B were used with diameter 13+/−0.5 mm and thickness 6.3+/−0.3 mm.

TABLE 2

Compression set values (CS) to DIN ISO 815 and adhesion studies with polyacetal

| PTS-THERMOPRENE | CS 70° C./24 h [%] | CS 100° C./24 h [%] | HOSTAFORM C9021 | | HOSTAFORM S9064 | | HOSTAFORM S9244 | |
|---|---|---|---|---|---|---|---|---|
| | | | Peel resistance [N/mm] | Adhesion factor | Peel resistance [N/mm] | Adhesion factor | Peel resistance [N/mm] | Adhesion factor |
| PTS-TP-85A10*9007 | 45 | 58 | 1.9 | 5 | 2.3 | 4 | 1.7 | 5 |
| PTS-TP-75A10*9007 | 44 | 56 | 2.2 | 5 | 2.4 | 5 | 2.3 | 5 |
| PTS-TP-70A10*9000 | 40 | 50 | 2.1 | 4 | 1.8 | 5 | 2.1 | 5 |
| PTS-TP-60A10*9000 | 53 | 58 | 2.5 | 5 | 2.4 | 4 | 2.5 | 5 |
| PTS-TP-55A10*9000 | 41 | 78 | 0.9 | 2 | 0.9 | 2 | 1.3 | 4 |
| PTS-TP-40A10*9007 | 59 | 71 | 1.4 | 3 | 0.7 | 2 | 1.3 | 3 |
| PTS-TP-65A22*807 | 60 | 80 | 0.8 | 2 | 1.8 | 3 | 0.5 | 2 |
| PTS-TP-65A60*807 | 64 | 86 | 0.4 | 2 | 1.2 | 3 | 1.1 | 2 |
| PTS-TP-75A20*9000 | 61 | 71 | 0.7 | 2 | 1.3 | 3 | 1.1 | 2 |
| PTS-TP-75A66*800 | 44 | 59 | 0.3 | 2 | 0.9 | 2 | 0.5 | 2 |
| PTS-UNIPRENE-7100-55*9000 | 29 | 33 | 0.0 | 1 | 0.0 | 1 | 0.0 | 1 |
| PTS-THERMOFLEX S3005/121*9007 | 73 | 82 | 4.5 | 5 | 5.2 | 5 | 5.4 | 5 |

Definition of Bonding of Material/Adhesion Factor

| No bonding | no adhesion, no composite part demolded | 1 |
|---|---|---|
| Adhesion | slight adhesion, no lasting adhesive bond between soft component and hard component | 2 |
| Adhesion-cohesion | good adhesion, soft component bonds securely (cohesion) to hard component but not over entire surface | 3 |
| Cohesion | very good adhesion, soft component bonds securely to hard component over entire surface, peel fracture within soft component | 4 |
| Cohesion > strength of material (C > SM) | bond strength is higher than strength of material; inseparable bond, peel then impossible, soft component breaks away prior to start of peel | 5 |

It is generally not possible to take peel resistance alone for assessment of adhesion. Fracture type is just as important.

Particularly in the case of relatively soft types of TPV, or in the case of types with relatively low ultimate tensile strength, with this the peel resistance is also lower than for relatively hard types of TPV (with generally relatively high ultimate tensile strengths). The study includes TPV materials which have low ultimate tensile strengths and therefore achieve low "peel forces". These "peel forces" are often ultimate tensile forces rather than peel forces. Adhesion factor 5 has then been used to indicate these cases. Table 2 shows the results for peel resistance and adhesion factor for the examples cited.

Generally, good to very good bond strength is achieved with the inventive materials on all tested types of polyacetal.

In many cases, cohesive fracture is achieved or bond strength is higher than the strength of the material of the soft TPV component. Added to this are the abovementioned properties, such as relatively low compression set and improved chemicals resistance with respect to fats and oils, which the known composite bodies with SEBS of the prior art do not have (PTS-THERMOFLEX comparative example). This inventive group of materials therefore opens up new fields of application, inter alia in the engine compartment of automobiles.

What is claimed is:

1. A composite body comprising a polyacetal portion and a modified thermoplastic vulcanizate portion, wherein one or more moldings comprising the modified thermoplastic vulcanizate portion is directly molded on a molding comprising the polyacetal portion such that the one or more modified thermoplastic vulcanizate molding partially or completely covers the polyacetal molding forming distinct bonded layers, wherein the strength of the bond between the polyacetal molding and the directly molded on one or more modified thermoplastic vulcanizate molding is at least 0.5 N/mm, wherein the modified thermoplastic vulcanizate portion comprises a modified thermoplastic vulcanizate elastomer having a hardness of 30 to 90 Shore A and wherein the modified thermoplastic vulcanizate elastomer comprises:

(a) 2 to 75% by weight of an at least partially crosslinked ethylene-propylene-diene rubber in from 1 to 50% by weight of a polyolefinic matrix further comprising 0.05 to 10% by weight of an ingredient selected from the group consisting of stabilizers, crosslinking aids, and mixtures thereof, wherein the polyolefinic matrix comprises polyethylene, polypropylene, or copolymers of polyethylene and polypropylene;

(b) 1 to 30% by weight of a compatibilizer, wherein the compatibilizer comprises a component selected from the group consisting of functionalized styrene-olefin block copolymers, methacrylate-butadiene-styrenes, methyl methacrylate-acrylonitrile-butadiene-styrenes, functionalized ethylene-propylene-diene rubbers, ethylenepropylene rubber, and mixtures thereof; and (c) 10 to 70% by weight of a non-olefinic thermoplastic material, wherein the non-olefinic thermoplastic material comprises a polymeric material selected from the group consisting of thermoplastic polyester urethane elastomers, thermoplastic polyether urethane elastomers, thermoplastic polyesters, thermoplastic polyesterester elastomers, thermoplastic polyetherester elastomers, thermoplastic polyetheramide elastomers, thermoplastic polyamides, thermoplastic polycarbonates, thermoplastic polyacrylates, acrylate rubbers, styrene-acrylonitrile-acrylate rubbers, and mixtures thereof, wherein components (a), (b), and (c) are compounded, all percentages by weight based on a total weight of the modified thermoplastic vulcanizate elastomer.

2. The composite body according to claim 1, wherein the modified thermoplastic vulcanizate elastomer has a compression set value after 24 hours at 70° C. of less than 65%.

3. The composite body according to claims 1, wherein the polyacetal portion comprises a polyoxymethylene copolymer.

4. The composite body according to claim 1, wherein the modified thermoplastic vulcanizate elastomer further comprises one or more additional components selected from the group consisting of plasticizer oils, organic fillers, inorganic fillers, reinforcing materials and combinations thereof.

5. The composite body according to claim 1, wherein the polyolefinic matrix comprises polypropylene.

6. The composite body according to claim 1, wherein the component (a) of the modified thermoplastic vulcanizate elastomer has an unreacted crosslinking agent content below 0.1% by weight, based on the total weight of the modified thermoplastic vulcanizate elastomer.

7. An article comprising a composite body according to claim 1, wherein the composite body is shaped to provide sealing or damping.

8. A composite article as claimed in claim 1, wherein the composite body consists of the polyacetal molding and the at least one overmolded modified thermoplastic vulcanizate.

9. A composite article as claimed in claim 1, wherein the modified thermoplastic vulcanizate consists of components (a), (b), and (c) and optionally one or more additional components selected from the group consisting of plasticizer oils, organic fillers, inorganic fillers, reinforcing materials and combinations thereof.

10. A process for producing a composite article comprising polyacetal and at least one modified thermoplastic vulcanizate elastomer, the process comprising:
(a) forming a polyacetal molding in a mold by an injection molding process; and
(b) overmolding the at least one modified thermoplastic vulcanizate elastomer onto the polyacetal molding giving an adhesive bond between the polyacetal and the modified thermoplastic vulcanizate elastomer of at least 0.5 N/mrin, wherein the modified thermoplastic vulcanizate elastomer comprises:
(i) 2 to 75% by weight of an at least partially crosslinked ethylene-propylene-diene rubber in from 1 to 50% by weight of a polyolefinic matrix further comprising 0.05 to 10% by weight of an ingredient selected from the group consisting of stabilizers, crosslinking aids, and mixtures thereof, wherein the polyolefinic matrix comprises polyethylene, polypropylene, or copolymers of polyethylene and polypropylene;
(ii) 1 to 30% by weight of a compatibilizer selected from the group consisting of functionalized styrene-olefin block copolymers, methacrylate-butadiene-styrenes, methyl methacrylate-acrylonitrile-butadiene-styrenes, functionalized ethylene-propylene-diene rubbers, ethylenepropylene rubber, functionalized polyolefins, and mixtures thereof; and
(iii) 10 to 70% by weight of a non-olefinic thermoplastic material, wherein the non-olefinic thermoplastic material comprises a polymeric material selected from the group consisting of thermoplastic polyester urethane elastomers, thermoplastic polyether urethane elastomers, thermoplastic polyesters, thermoplastic polyesterester elastomers, thermoplastic polyetherester elastomers, thermoplastic polyetheramide elastomers, thermoplastic polyamides, thermoplastic polycarbonates, thermoplastic polyacrylates, acrylate rubbers, styrene-acrylonitrile-acrylate rubbers, and mixtures thereof;
all percentages by weight based on a total weight of the modified thermoplastic vulcanizate elastomer.

11. The process according to claim 10, wherein the polyacetal molding is preheated to a temperature of from 80° C. to less than its melting point prior to overmolding of the thermoplastic vulcanizate elastomer, the melt temperature of the modified thermoplastic vulcanizate elastomer being from 170° to 270° C., and wherein the process is carried out in a mold having a mold temperature of 20° to 140° C.

12. The process as claimed in claim 10, wherein after forming the polyacetal molding, the polyacetal molding is cooled and removed from the mold and in a subsequent injection-molding step, the polyacetal molding is placed into another mold with a recessed cavity and the at least one modified thermoplastic vulcanizate is injected into the mold.

13. The process as claimed in claim 10, wherein after forming the polyacetal molding, the polyacetal molding is only partly removed from the mold and, together with a portion of the original mold, placed in a larger cavity and the at least one modified thermoplastic vulcanizate is injected into the mold.

14. The process as claimed in claim 10, wherein the composite body is formed via a sliding split-mold technique.

15. The process as claimed in claim 10, wherein the composite article consists of the polyacetal and the at least one modified thermoplastic vulcanizate.

16. The process as claimed in claim 10, wherein the modified thermoplastic vulcanizate consists of components (i), (ii), and (iii) and optionally one or more additional components selected from the group consisting of plasticizer oils, organic fillers, inorganic fillers, reinforcing materials and combinations thereof.

* * * * *

UNITED STATES PATENT AND TRADEMARK OFFICE
CERTIFICATE OF CORRECTION

| | |
|---|---|
| PATENT NO. | : 7,858,202 B2 |
| APPLICATION NO. | : 11/576309 |
| DATED | : December 28, 2010 |
| INVENTOR(S) | : Prigandt et al. |

It is certified that error appears in the above-identified patent and that said Letters Patent is hereby corrected as shown below:

On the Title Page Item (54) & Col. 1, Lines 1-7 the Title "Composite Bodies Having..." should read --Composite Body Made From Polyacetal And Thermoplastic Vulcanised Elastomer--

Column 14, Line 40 "0.05to 10% by weight..." should read --0.05 to 10% by weight...--

Column 15, Line 40 "0.5 N/mrin..." should read --0.5 N/mm...--

Column 15, Line 45 "0.05to 10% by weight..." should read --0.05 to 10% by weight...--

Signed and Sealed this
Tenth Day of April, 2012

David J. Kappos
*Director of the United States Patent and Trademark Office*